UNITED STATES PATENT OFFICE 2,649,431

VULCANIZATION OF SYNTHETIC RUBBER WITH ALKYL DIMETHYLOL PHENOL AND FORMALDEHYDE

Julian R. Little, Packanack Lake, N. J., assignor to United States Rubber Company, New York, N. Y., a corporation of New Jersey No Drawing. Application March 5, 1951,
Serial No. 214,009

9 Claims. (Cl. 260—41.5)

This invention relates to the vulcanization of synthetic rubber selected from the group consisting of polymers of aliphatic conjugated diolefins and copolymers of aliphatic conjugated diolefins with other copolymerizable monomeric material, which copolymers contain copolymerized therein at least 25% of aliphatic conjugated diolefin, by the use of a vulcanizing agent composed of a compound having the formula

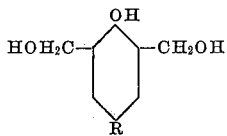

where R is alkyl, in conjunction with formaldehyde as a vulcanization accelerator. In the above formula, R can be any alkyl group and usually is an alkyl group having from 1 to 18 carbon atoms. Examples are methyl, ethyl, n-propyl, isopropyl, n-butyl, isobutyl, sec-butyl, tertiary butyl, any of the amyl, hexyl, octyl, decyl, dodecyl and octadecyl groups.

The method of my invention comprises heating a mixture of the synthetic rubber with carbon black in an amount equal to at least 15 parts per 100 parts of said rubber, the above defined compound, and formaldehyde.

The preferred vulcanizing agent for use in my invention is 2,6-dimethylol-4-tertiarybutylphenol.

The vulcanizing agents used in my invention can be employed in widely varying amounts. I prefer, however, to use 0.25 to 8 parts per 100 parts of rubber.

The formaldehyde is most conveniently added to the rubber in the form of a normally solid polymer, e. g., paraformaldehyde or trioxymethylene, which is easily broken down to formaldehyde when heated or treated with an acid.

The amount of formaldehyde employed as accelerator can also vary widely, but I prefer to employ from 0.5 to 5 parts thereof per 100 parts of the rubber.

It is essential that at least 15 parts of carbon black be used per 100 parts of the rubber. The type of carbon black is not critical. The black can be any of the reinforcing, semi-reinforcing or non-reinforcing carbon blacks commonly used in the rubber industry. It can be made by any suitable process. Examples are channel black and furnace black. Acetylene black also is operative even though it is the least reinforcing of the rubber blacks. Examples of commercial blacks which can be used include Philblack O, Wyex, Kosmos 80, Statex B, Spheron 6, P-33, Thermax and Shawinigan. Of course, the physical properties of the vulcanizates will vary considerably depending upon the type of carbon black used, as is well known to anyone skilled in rubber compounding. So far as vulcanization is concerned, the maximum amount of carbon black is not critical. However, those skilled in the art will understand that the practical maximum is that figure at which the physical properties of the vulcanizate begin to fall off objectionably.

Examples of synthetic rubber to which my invention is applicable include copolymers of butadiene and styrene whether made by the standard, i. e., hot process, or by the cold process; copolymers of butadiene and acrylonitrile, copolymers of butadiene and methyl acrylate, and homopolymers of aliphatic conjugated diolefins typified by butadiene. My invention can be applied to any rubbery copolymer of an aliphatic conjugated diolefin and any other copolymerizable monomer, which copolymer contains copolymerized therein at least 25% of said diolefin. The synthetic rubber used must possess substantial olefinic unsaturation in order that it be vulcanized by the phenol derivatives of the present invention.

The synthetic rubber, carbon black, vulcanizing agent and formaldehyde, together with any other desired materials, such as other non-reinforcing fillers and compounding agents commonly employed in the rubber industry, are intimately mixed in any convenient manner, e. g., on a rubber mill or in an internal mixer. The compounded rubber is then converted to any desired shape and size and is vulcanized at 150 to 250° C., preferably at 165 to 225° C., in any well-known manner as in a mold under pressure or in an open container in an oven.

The vulcanization procedure of the present invention has many advantages over previously known vulcanizing processes. Among these are the following:

1. The rubber stocks vulcanized by the new process of my invention have a far better resistance to oxidative aging than does rubber vulcanized with sulfur. For example, when aged in air at 100° C., the new stocks of my invention deteriorate less than one-third as rapidly as a standard sulfur stock. Thus, these new stocks are especially useful in products which must be kept for considerable periods of time at high temperatures. Such products are curing bags for tires, rubber motor mountings, steam hose, gaskets and belts for hot machinery, conveyor belts for moving hot materials, flexible hot air ducts, hot water bottles, etc.

2. The new stocks of the present invention may be used in contact with metals such as copper, silver, etc. which are tarnished by stocks vulcanized by sulfur. The advantage of using these new non-sulfur vulcanizates for rubber-metal objects; e. g., composite rubber and metallic cloth or fabric articles, rubber-insulated wire, head lights, silverware, copperware, etc., is obvious.

3. By carrying out the vulcanization in the presence of carbon black, the amount of the phenol derivatives used as vulcanizing agents can be kept so low as to be commercially practical. For example, as indicated above, amounts ranging from 0.25 to 8 parts per 100 parts of rubber are eminently feasible. Prior art workers such as van der Meer—Dutch Patent 58,664, and Rubber Chemistry & Technology, 18, 853–73 (1945) and 20, 173–181 (1947)—reported that in most cases 40 to 50 parts of a phenolic compound were needed to vulcanize rubber in the absence of carbon black. It is well-known that the addition of carbon black to a stock containing sulfur as the vulcanizing agent decreases the effectiveness of the accelerator and stearic acid; i. e., that more of each is required in a rubber stock containing carbon black than in a gum rubber stock to attain equivalent vulcanization. Furthermore, the sulfur level cannot be decreased because of the presence of the carbon black. Consequently, the great increase in the effectiveness of the phenolic vulcanizing agents of my invention as a result of the addition of carbon black was unexpected.

4. Another advantage of my invention is that whereas no one heretofore has been able to accelerate the vulcanization of rubber by phenolic compounds, I have discovered that vulcanization with the specific phenolic compounds described above can be greatly accelerated by means of formaldehyde, whereby much more efficient use of vulcanizing equipment is brought about.

5. The compounded but unvulcanized stocks made in accordance with the principles of my invention can be processed at higher temperatures without scorching than can stocks containing sulfur as the vulcanizing agent. This is particularly advantageous when shaping articles by injection molding.

The following example illustrates the invention more fully. All parts mentioned in this specification are by weight.

*Example*

Stocks having the composition set forth in the following table were prepared in the conventional manner and were then vulcanized at 195° C. for the time shown. The vulcanizates were tested at room temperature.

| Stock | A | B | C | D |
|---|---|---|---|---|
| GR–S Masterbatch a | 155 | 155 | 155 | 155 |
| 2,6-Dimethylol-4-tert.butylphenol | 2 | 2 | 2 | 2 |
| Paraformaldehyde | | | 2 | 2 |
| Vulcanization time (min.) | 60 | 120 | 60 | 120 |
| Tensile strength (p. s. i.) | 835 | 1,375 | 1,475 | 1,595 |
| Elongation (percent) | 475 | 445 | 475 | 305 |
| Modulus at 200% elongation (p. s. i.) | 400 | 580 | 540 | 900 | a Pre-mixed masterbatch of 100 parts of GR–S and 55 parts of Philblack O, a high abrasion furnace black.

Stocks A and B are shown merely for comparison with stocks C and D which illustrate my invention. The example shows that the paraformaldehyde accelerates the vulcanization of the GR–S by the phenolic compound.

Having thus described my invention, what I claim and desire to protect by Letters Patent is:

1. The method of vulcanizing synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, a vulcanizing agent composed of a compound having the formula

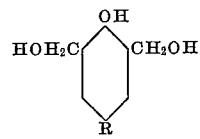

where R is alkyl, and formaldehyde as a vulcanization accelerator.

2. The method of vulcanizing synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, a vulcanizing agent composed of 2,6-dimethylol-4-tertiarybutylphenol, and formaldehyde as a vulcanization accelerator.

3. A vulcanizate of a mixture of synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, a vulcanizing agent composed of a compound having the formula

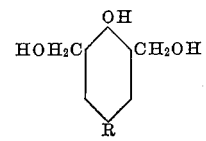

where R is alkyl, and formaldehyde as a vulcanization accelerator.

4. A vulcanizate of a mixture of synthetic rubber selected from the group consisting of polymers of aliphatic conjugated diolefins and copolymers of an aliphatic conjugated diolefin and another monomer, which copolymers contain at least 25% of an aliphatic conjugated diolefin, carbon black in an amount equal to at least 15 parts per 100 parts of said rubber, a vulcanizing agent composed of 2,6-dimethyol-4-tertiarybutylphenol, and formaldehyde as a vulcanization accelerator.

5. The method of vulcanizing synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, a vulcanizing agent composed of a compound having the formula

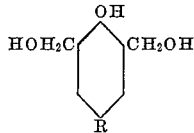

where R is alkyl, the amount of said vulcanizing agent ranging from 0.25 to 8 parts per 100 parts of said rubber, and formaldehyde as a vulcanization accelerator, the amount of said formaldehyde ranging from 0.5 to 10 parts per 100 parts of said rubber.

6. The method of vulcanizing a rubbery copolymer of butadiene and styrene which comprises heating a mixture of said copolymer, carbon black in an amount equal to at least 15 parts per 100 parts of said copolymer, a vulcanizing agent composed of a compound having the formula

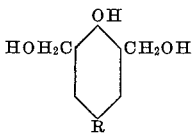

where R is alkyl, and formaldehyde as a vulcanization accelerator.

7. The method of vulcanizing synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, which comprises heating a mixture of said rubber, carbon black in an amount equal to at least 15 parts per 100 parts of said rubber, a vulcanizing agent composed of a compound having the formula

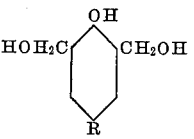

where R is alkyl, and a solid polymer of formaldehyde as a vulcanization accelerator.

8. A vulcanizate of a mixture of synthetic rubber selected from the group consisting of polymers of aliphatic conjugated diolefins and copolymers of an aliphatic conjugated diolefin and another monomer, which copolymers contain copolymerized therein at least 25% of an aliphatic conjugated diolefin, carbon black in an amount equal to at least 15 parts per 100 parts of said rubber, a vulcanizing agent composed of a compound having the formula

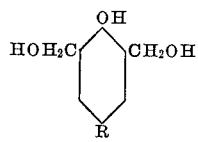

where R is alkyl, the amount of said vulcanizing agent ranging from 0.25 to 8 parts per 100 parts of said rubber, and formaldehyde as a vulcanization accelerator, the amount of said formaldehyde ranging from 0.5 to 10 parts per 100 parts of said rubber.

9. A vulcanizate of a rubbery copolymer of butadiene and styrene, carbon black in an amount equal to at least 15 parts per 100 parts of said copolymer, a vulcanizing agent composed of a compound having the formula

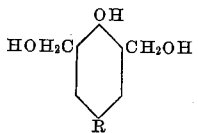

where R is alkyl, and formaldehyde as a vulcanization accelerator.

JULIAN R. LITTLE.

References Cited in the file of this patent

Vanderbilt Rubber Handbook (1948), page 124.
Modern Plastics, pages 154–156, 210, and 212, Oct. 1946.